United States Patent [19]

Motozato et al.

[11] Patent Number: 4,948,814
[45] Date of Patent: Aug. 14, 1990

[54] ION EXCHANGER BASED ON CROSS-LINKED GLUCOMANNAN

[75] Inventors: Yoshiaki Motozato, Kumamoto; Takashi Tomoda, Ebina; Hiroshi Morita, Hatano; Masato Yamaguchi, Ebina; Isao Joko, Ayase, all of Japan

[73] Assignee: Kurita Water Industries Ltd., Tokyo, Japan

[21] Appl. No.: 248,820

[22] Filed: Sep. 23, 1988

[30] Foreign Application Priority Data

Oct. 6, 1987 [JP] Japan ................................. 62-250701

[51] Int. Cl.$^5$ ............................................ C08B 37/00
[52] U.S. Cl. ........................................ 521/30; 536/1.1; 210/660; 210/666
[58] Field of Search ................ 536/1.1; 210/602, 660, 210/666; 521/30

[56] References Cited

FOREIGN PATENT DOCUMENTS 960652 1/1975 Canada .
236839 10/1987 Japan .

OTHER PUBLICATIONS

Wood and Fiber Science, 18(3) 1986, pp. 436–445.
Agric. Biol. Chem., 42(9), 1645, pp. 1645–1650, 1978.

Primary Examiner—John Kight, III.
Assistant Examiner—Carlos Azpuru
Attorney, Agent, or Firm—Flynn, Thiel, Boutell & Tanis

[57] ABSTRACT

A novel ion exchanger useful for universal ion-exchange purposes and, in particular, for ion exchanger for ion-exchange chromatography is proposed, said novel ion exchanger being obtained by introducing radicals of one or more ion-exchangeable groups into cross-linked glucomannan beads by a chemical treatment thereof. Such ion exchanger beads are superior in the compressive strength and permit a high flow rate of the liquid to be subjected to ion exchange through an exchange column packed with them.

9 Claims, 1 Drawing Sheet

ION EXCHANGER BASED ON CROSS-LINKED GLUCOMANNAN

BACKGROUND OF THE INVENTION

1. Field of the Invention

The present invention relates to a novel ion exchanger of spherical beads based on cross-linked glucomannan and, more specifically, to an ion exchanger superior in compressive strength permitting to use under high hydrodynamic shear stress, for general ion-exchange purposes and, in particular, for ion-exchange chromatography.

2. Description of the Prior Art

As typical ion exchangers for ion-exchange chromatography, there are found in the market today DEAE-Sephadex A-50 (DEAE is an abridgement of diethylaminoethyl and is used below throughout the Specification), DEAE-Sepharose CL-6B, CM-Sephadex C-50 (CM is an abridgement of carboxymethyl) and CM-Sepharose CL-6B, all trademarks, of the firm Pharmacia Fine Chemicals. They are each produced by the use of a natural high molecular weight substance as the starting material and are used for separating high molecular weight substances, such as, proteins, polysaccharides, nucleic acids, membrane components and so on.

These prior art ion exchangers have a disadvantage that each bead of the ion exchanger becomes, due to lower compressive strength, deformed upon ion exchange operation at high flow velocity whereby a considerable reduction in the separation efficiency is caused. A further increase in the flow velocity may cause a steep rise of the pressure loss in the exchanger column and may result even in a blockade of the column.

In the case of using an ion exchanger for the separation of, such as, proteins, polysaccharides, nucleic acids, membrane components and other high molecular weight substances, it is necessary in general to provide for the subsequent adsoption step, namely ion exchange step, by removing all the substances combined by ionic bond.

In general, it is conventional to remove contaminants, such as lipids and proteins, by washing out with an aqueous NaOH solution of a concentration of about 0.1M, followed by a complete removal of the residual alkali by washing with distilled water, with a buffer solution or with a salt solution. This procedure is rather more laborious than the ionic adsorption procedure, requires longer time and, thus, constitutes a principal cause of the extended entire operation cycle composed of the process steps of ionic adsorption, desorption (elution), water wash and regeneration. It is therefore preferable in a practical operation to reduce the process periods in the washing and regeneration steps, rather than to reduce the process period in the adsorption step of the objective substance. In order to meet such a practical expectation, beads of ion exchanger having higher compressive strength and permitting a high liquid flow rate are to be provided.

On the other hand, it has been proposed in the Japanese Patent Application Lay-Open No. 236839/1987 to employ glucomannan beads, which have a cross-linked structure and exhibit a degree of swelling in the range from 1.5 to 15 in terms of number of ml of wet gel bed per g of dry gel, an exclusion limit molecular weight in the range from 200 to 100,000,000 and an average bead size in the range from 1 to 500 $\mu$m, for the packing material in the techniques of gel filtration and gel chromatography. Glucomannan beads do not, however, have ion exchange capacity and, therefore, cannot be used for ion-exchange chromatography.

BRIEF SUMMARY OF THE INVENTION

An object of the present invention is to provide an ion exchanger in which the above disadvantage of lower compressive strength of the prior art ion exchanger beads has been eliminated.

Another object of the invention is to provide an ion exchanger for use in separating various biological substances basing on the difference in the electric charge.

A further object of the present invention is to provide a novel ion exchanger under the use of cross-linked glucomannan as the matrix, into which bonded radicals of at least one ion-exchangeable group are to be introduced.

The ion exchanger according to the present invention comprises beads of cross-linked glucomannan having radicals of one or more ion-exchangeable groups introduced by a chemical treatment of the beads.

DETAILED DESCRIPTION OF THE INVENTION

Figure 1:
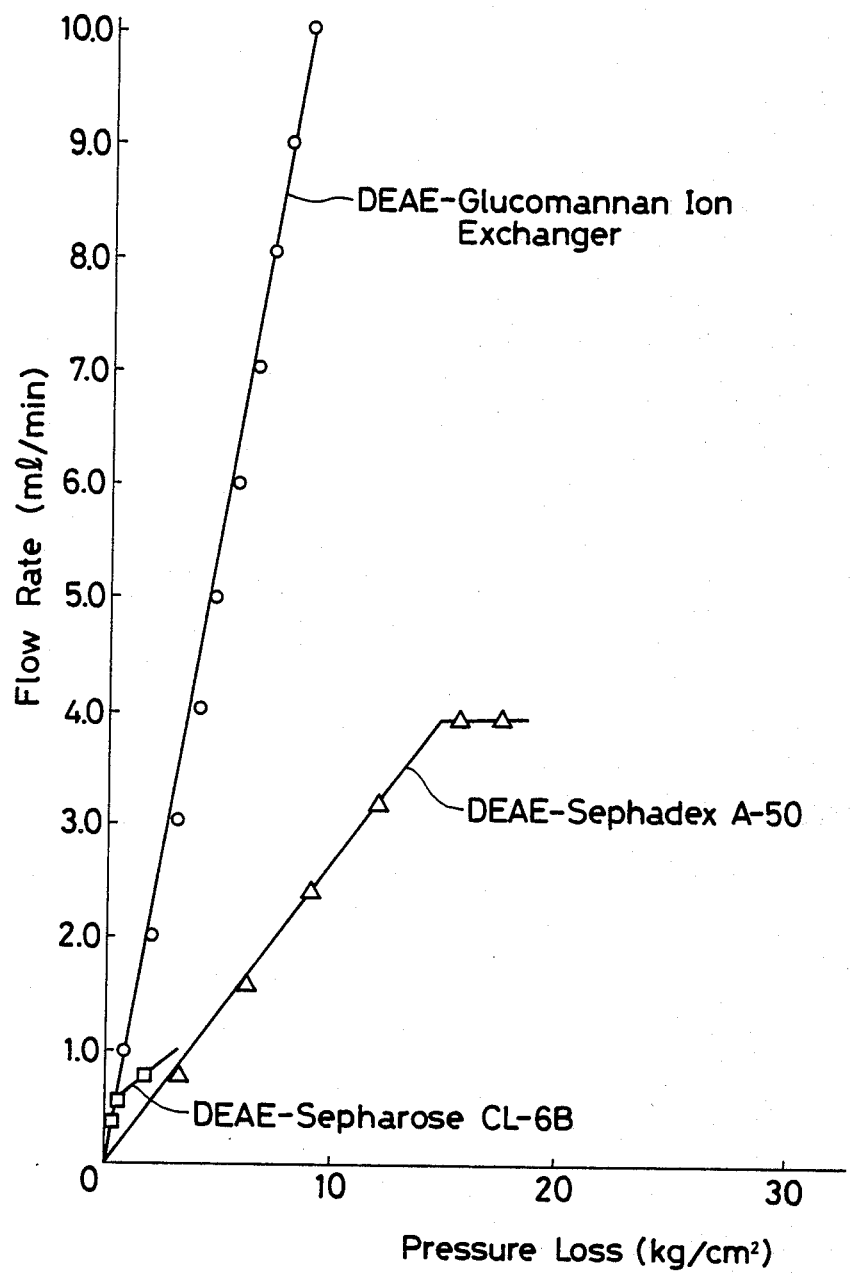
FIG. 1 is a graph showing the relationship between the flow rate of the liquid to be subjected to ion exchange and the pressure loss in the exchange column upon ion exchange operation.

The ion-exchangeable group to be introduced into the cross-linked glucomannan according to the present invention may be any one capable of being subject to ion exchange known in the art to be effective for being introduced into ion exchanger, such as, diethylaminoethyl (DEAE), carboxymethyl (CM), sulfomethyl, primary to tertiary aminoethyls, quaternary ethylammonium, sulfopropyl, phosphato and so on.

The introduction of the ion-exchangeable group can be effected by a conventional technique. For example, cross-linked glucomannan beads are first soaked in a solution of an alkali and are then reacted with a reagent having a halogeno terminal group and forming a combined radical of an ion-exchangeable group.

For the reagent to be reacted as above, there may be used, for example, 2-chloro-triethylamine hydrochloride, chloroacetic acid, salts of chloromethane sulfonic acid, phosphoryl chloride and so on. For the alkali, sodium hydroxide, potassium hydroxide and so on are exemplified.

The ion-exchange capacity of the ion exchanger according to the present invention obtained by introducing ion-exchangeable group into the beads of cross-linked glucomannan should preferably be in the range from 0.1 to 5 meq. per gram of dry beads.

The cross-linked glucomannan beads to be used according to the present invention should preferably have a degree of swelling in the range from 1.5 to 15 and, more preferably, from 2 to 8, an exclusion limit molecular weight in the range from 200 to 100,000,000, preferably from 100,000 to 100,000,000, and an average bead diameter in the range from 5 to 500 $\mu$m.

By the "glucomannan" as used in the specification of the present invention is meant a polysaccharide consisting, as the main constituents, of D-glucose and D-mannose. As a commercially available product, there may be employed adequately konjakmannan, which is obtained from the plant Amorphophalus konjak, though other products may of course be used.

The cross-linked glucomannan beads to be used in the present invention are those obtained from such glucomannan products by incorporating therein a cross-linked structure by reaction with a cross linking agent.

It is preferable to adjust the degree of swelling and the exclusion limit molecular weight of the spherical beads of cross-linked glucomannan according to the present invention by preparing them so as to exhibit a porous macrostructure. It is possible, alternatively or concurrently, to incorporate regulation of the degree of cross linking to adjust the swelling degree and the exclusion limit molecular weight.

The cross-linked glucomannan beads can be obtained by preparing a starting solution by dissolving an esterified product of glucomannan solely or together with a diluent in a solvent which has a boiling point lower than the aqueous medium to be used afterwards as the medium for suspending this starting solution and is immiscible or only scarcely miscible with this aqueous medium, suspending the starting solution in the aqueous medium suggested above so as to form liquid droplets of the esterified glucomannan, evaporating off the solvent contained in the liquid droplets, saponifying the resulting spherical beads of the esterified glucomannan and finally reacting the so obtained saponified beads with a cross linking agent.

The spherical beads of cross-linked glucomannan according to the present invention can be prepared in the practice as follows:

As the starting glucomannan, a commercially available glucomannan product as such or a refined product treated by dissolving a commercial product once in water and precipitating the glucomannan from this aqueous solution by an addition of a non-solvent, in which glucomannan is not or scarcely soluble, such as, ethyl alcohol, methyl alcohol or so on, may be employed. The starting glucomannan is swollen with a solvent, such as, formamide, dimethylformamide or the like, and thereto is added an acid to cause a reaction to esterify the glucomannan using an esterification catalyst, such as, pyridine or so on. For the acid, those of organic or inorganic nature, such as, acetic acid, acetic anhydride, propionic acid, butylic acid, nitric acid and so on, may be employed. One or more acids can be used in order to obtain a mixed ester. In the case of using an acid having a free carboxyl group, water is formed upon reaction with glucomannan, which may cause the molecular chain of glucomannan to tend to be broken down, so that it is preferable to install a means for dewatering. In contrast thereto, an acid anhydride, such as acetic anhydride etc., does not form reaction water and is most advantageous. The esterification is incorporated in order to render the glucomannan insoluble in water, so as to allow to form suspended particles of glucomannan. It is desirable to esterify most part, preferably more than 85%, especially more than 90%, of the OH groups in the glucomannan.

The thus esterified glucomannan is then purified using acetone and so on. Here, if the esterification yield is less than 85%, the solubility of the glucomannan in acetone etc. is lower, so that the rate of recovery becomes decreased. The esterified glucomannan is thereafter deposited by contacting it with water and is then dried sufficiently.

Then, the ester of glucomannan thus obtained is dissolved solely or together with a diluent in a solvent. For the solvent, it is necessary to employ those which have boiling points lower than the aqueous medium used as the suspending medium, as will be explained later on, and which are not or scarcely miscible with said aqueous medium. For the solvent, chlorinated hydrocarbons, for example, dichloromethane, chloroform, carbon tetrachloride and trichloroethylene, are employed in the practice solely or in mixture. Chlorinated hydrocarbon solvents are suitable for this invention, because they offer sufficient solubility for glucomannan but are not or scarcely missible with water.

The concentration of the solution of glucomannan ester prepared as above should be such that spherical beads will be formed after it is introduced into an aqueous medium and the beads may possess sufficient strength for use for packing material for, such as, ion-exchange chromatography, after the solvent has been removed by evaporation. The concentration may, in general, be from 0.2 to 20%, prepferably from 0.5 to 5% and, in particular, from 0.5 to 2% by weight.

If the concentration of the glucomannan ester is less than 0.2% by weight, a fine precipitate in a flaky form will be formed and beads are not obtained. On the other hand, if it exceeds 20% by weight, the particle size will become excessively large and the particle will exhibit a non-porous surface, which makes the product impossible to employ for packing material.

In preparing the above mentioned solution of the glucomannan ester, while it is possible to dissolve the ester solely in a solvent as explained above, it is preferable to employ an adequate diluent for facilitating the adjustment of the degree of swelling and the exclusion limit molecular weight.

The diluent is used in order to adjust the degree of swelling and exclusion limit molecular weight by forming a porous macrostructure inside the bead formed, after the diluent has been removed from the bead to leave behind voids or pores. For the diluent, those which have boiling points higher than that of said solvent and which do not dissolve the glucomannan ester are employed. Concrete examples therefor include tetrahydronaphthalene, decahydronaphthalene, ethyl benzene, diethyl benzene, methyl dodecanoate, methyl caprinate, toluene, hexyl alcohol, heptyl alcohol and octyl alcohol.

When glucomannan is rendered swollen preliminarily with formamide, especially tetrahydronaphthalene and decahydronaphthalene are chosen as the diluent to obtain preferable results.

The amount of the diluent to be added may be chosen in accordance with the contemplated degree of swelling and with the exclusion limit molecular weight to be aimed at. In the case of, for example, preparing a gel product having a degree of swelling of 3 and an exclusion limit molecular weight of over 1,000,000, the amount of diluent may be, as a rough measure, in the range of 100–1,000%, preferably from 100 to 500%, based on the weight of the glucomannan ester employed.

The starting process solution containing the ester of glucomannan according to the present invention is prepared as described above.

The starting process solution is then introduced into an aqueous medium, in order to cause formation of spherical liquid droplets of the process solution suspended in the aqueous medium as the precursor of the beads of glucomannan ester.

As the aqueous medium, water or an aqueous solution containing a hydrophilic protective colloid, such as, partially hydrolyzed polyvinyl acetate, polyvinyl alcohol, carboxymethyl cellulose, ethylcellulose, methylcellulose, soluble starch, gelatine and so on, may be used.

The use of, above all, partially hydrolyzed polyvinyl acetate and polyvinyl alcohol as the protective colloid is preferable, since they dissolve quite well in water even at lower temperature and, in addition, reveal the ability for dispersing particles and an effect of increasing the viscocity more easily as compared with other ones.

The protective colloid may preferably be employed in a form of an aqueous solution of a concentration of 0.1–10% by weight, preferably 0.3–5% by weight.

A concentration of protective colloid lower than 0.1% by weight tends to form glucomannan particles having excessively large particle size and concentrations outside the range of from 0.1 to 10% by weight tend to produce glucomannan particles of not spherical form.

The aqueous medium may preferably be used at least in the same volume and preferably in an amount of 2–20 times of the volume of the glucomannan ester solution.

The starting process solution is introduced into the aqueous medium all at once, followed by agitation to disperse to form a suspension or, it may be introduced into the aqueous medium held in an agitated state all at once or dropwise to form a suspension. The intensity of agitation is so regulated, that the average bead size of the final product will be from 1 to 500 μm.

Upon introduction of the starting solution into the aqueous medium, the glucomannan ester will be dispersed and suspended finely in the aqueous medium, since esterified glucomannan is insoluble in water. Here, evaporation of the solvent starts concurrently with the formation of beads. In this manner, spherical beads of glucomannan ester from which the solvent has substantially be evaporated off will finally be obtained.

For the temperature for evaporating off the organic solvent in the liquid droplets, a temperature above the freezing point of the aqueous medium and below the boiling point of the organic solvent is employed. Here, a temperature which is lower than the boiling point of the organic solvent, in particular by 1°–15° C., is preferred, in order to keep the spherical form of the bead in a better manner and to facilitate the evaporation of the organic solvent.

During the process step for evaporating off the organic solvent from the liquid droplets, the aqueous medium is held under agitation so as to maintain the spherical form of the liquid droplet. After the organic solvent contained in the liquid droplets has been evaporated off, spherical beads are left behind.

The beads are formed in a gelled state and contain internally the diluent within a pumice-like porous matrix and can hold their shape of beads after they have been taken out of the aqueous medium. The diluent contained in the beads of glucomannan ester is removed partly in this process step and will be removed completely in the subsequent process step of saponification.

The spherical beads of glucomannan ester are then subjected to a saponification after they have been taken out of the aqueous medium. The saponification is effected for restoring the water soluble nature by re-conversion into free glucomannan. Here, substantially all the esterified glucomannan is saponified. It is necessary to employ a saponification bath which permits to effect saponification without causing any harmful effect to the spherical form of the glucomannan ester beads which have restored their water-solubility after the re-conversion into free glucomannan. As the saponification bath, for instance, an alcohol solution of alkali hydroxide, such as a methanol solution of sodium hydroxide or potassium hydroxide, an aqueous solution of alkali hydroxide, such as an aqueous solution of sodium or potassium hydroxide dissolved in an aqueous solution of salts such as sodium sulfate etc., may be used.

One concrete manner of effecting the saponification consists in that spherical beads of a glucomannan ester are soaked in an amount of methanol, which may amount to 5–10 times of the weight of the beads in accordance with each particular requirement, for 0.1–2 hours. The thus soaked beads are then introduced into a saponification bath of a mixture, which consists of an alcohol, such as, methanol etc., and of an aqueous solution of sodium hydroxide in a weight ratio of [alcohol]:[aqueous solution] of [9~7]:[1~3] and has a concentration of 0.1–5N NaOH, in such an amount that the ratio of [glucomannan]:[NaOH] is 1:[0.5~10] on the weight basis, and the mixture is agitated at room temperature for 10–24 hours to effect the saponification. Here, the sodium hydroxide solution may be incorporated by adding it dropwise so as to reach finally said range. If the concentration of NaOH of the bath is lower than 0.1N, the saponification does not proceed sufficiently and, on the other hand, if it exceeds 5N, cracks may occur in the beads. If the content of the alcohol is outside of the above mentioned range, undesirable phenomena, such as, elution or leakage of the saponified glucomannan and abnormal progress of saponification and so on, may appear.

During this saponification step, the glucomannan ester in the beads is saponified and the diluent contained in the beads will be extracted into the alcohol, leaving behind many voids or pores inside the bead to form a porous macrostructure.

One concrete manner of effecting the saponification with an aqueous alkali solution consists in that the spherical beads of glucomannan ester are introduced into an aqueous solution prepared by dissolving sodium hydroxide or potassium hydroxide in an aqueous solution of sodium sulfate and the mixture is agitated for 24 hours at room temperature.

The concentration of the alkali hydroxide in this aqueous solution is 10–15% by weight and the amount of the alkali hydroxide may not be less than 50%, based on the amount of the glucomannan ester. The amount of sodium sulfate employed may be in the range of 20 to 30%, based on the total weight of aqueous solution.

Among the concrete manners of saponification described above, the use of alcohol/aq. NaOH mixture may be more preferable from the reasons that it realizes simultaneous elution or removal of the residual diluent and so on.

The thus obtained beads of glucomannan which have restored their water-solubility by the saponification are then contacted with a cross linking agent. The cross linking agent will penetrate into the inside of the spherical bead of glucomannan to realize cross linking of the glucomannan molecules with each other. For the cross linking agent, bifunctional compounds, such as, epichlorohydrin, diepoxybutane, tolylene diisocyanate, hexamethylene diisocyanate and so on, can be employed.

The cross linking agent is employed in a form of a solution in an organic solvent.

As the organic solvent for the cross linking agent, there may be employed kerosene or liquid paraffin or a mixture of them (for example, in a volume ratio of 7:3) with addition of a surface active agent (a non-ionic surfactant, such as, sorbitan fatty acid ester) in an amount of 1–2% by weight. Another example of the solvent for the cross linking agent consists of a mixture of acetone with dimethyl sulfoxide (with a volume ratio of, for example, 6:4).

The concentration of the solution of cross linking agent may be at least 0.01 mole per liter of the cross linking solution and preferably in the range from 0.01 to 15 moles per liter of the cross linking solution.

The cross linking of glucomannan in the spherical beads is attained by introducing 1–5 parts by weight of the glucomannan beads into 100 parts by weight of the solution of cross linking agent and agitating the mixture at a temperature of about 60° C. for 24–36 hours. The thus cross-linked spherical beads of glucomannan are then filtered off and rinsed with acetone and washed then using a neutral surfactant, followed by water wash.

If the amount of cross linking agent used is short of the above mentioned value, the stability against pressure will become inferior.

The ion exchanger according to the present invention is based on beads of cross-linked glucomannan into which radicals of one or more of ion-exchangeable group have been introduced by a chemical treatment thereof. It is therefore insoluble in water, in aqueous alkalis and in aqueous acids and is robust also in the physical nature. The degree of swelling thereof should be in the range from 1.5 to 15, preferably from 2 to 8, so that it is superior in water-retaining ability, which renders it suitable for use for general ion-exchange purposes. If the degree of swelling is less than 1.5, the beads may not be employed practically for an ion exchanger due to the decrease in the water-retaining ability. If the degree of swelling exceeds over 15, the compressive strength of the bead becomes intolerably decreased.

The exclusion limit molecular weight of the ion exchanger according to the present invention can distribute within a wide range from 200 to 100,000,000 which is far wider as compared with conventional hydrophilic gels. For separating inorganic ions and low molecular weight substances, a product having lower exclusion limit molecular weight may be employed satisfactorily. However, it is required to use a gel product having an exclusion limit molecular weight of at least 10,000, preferably from 100,000 to 100,000,000, for producing the ion exchanger of the present invention for use for separation of, such as proteins etc. Particularly, beads with high exclusion limit molecular weight have considerably higher compressive strength as compared with other gel products.

By the exclusion limit molecular weight is meant such a limiting molecular weight, that particles having molecular weights higher than this limitation will not be allowed to penetrate through the micropores of the packing material. This is represented in practice in terms of the molecular weight determined by the procedure, in which a series of aqueous solutions of a certain high molecular weight substance, such as, dextran, polyethylene glycol etc., of varying known molecular weights are passed through a column charged with a packing material to be tested, in order to observe each eluted amount using a differential refractometer, spectrophotometer or so on and the data observed are plotted on a graph with respect to the molecular weight of the substance observed and reading the molecular weight value at the break of the curve.

The ion exchanger based on beads of cross-linked glucomannan according to the present invention are especially suitable for use for the packing material for ion-exchange chromatography, while other uses for universal ion exchange purposes are also permissible.

Using the ion exchanger according to the present invention in ion exchange chromatography, a marked increase in the separation efficiency in separating various biological substances can be attained, since it permits a remarkably high flow rate of the liquid containing such biological substances, which conventional ion exchangers have not ever permitted. In a separation of physiologically active substances or the like, it is required to effect treatment operations within a period of time as short as possible, since there may occur an activity depression of the substances during the separation procedures due to possible existence of instability of the substances included. Here, a high flow rate of the liquid to be subjected to the ion-exchange chromatography will save such a problem and reveals an inventive feature of the ion exchanger according to the present invention.

PREFERRED EMBODIMENTS OF THE INVENTION

In the following, the present invention will be described by way of Examples.

EXAMPLE 1

(1) Production of Cross-linked Glucomannan Beads 40 g of konjakmannan powder were dissolved in 4 λ of deionized water at 60°–70° C. with agitation. This solution was dropped in small portions into 6 λ of ethanol to cause deposition of the glucomannan, which was filtered out and dried in air and then under vacuum at 20° C. 30 g of this dried glucomannan were introduced into 1 λ of formamide and stored for two days to cause it to swell. Thereto were then added 300 mλ of pyridine and 300 mλ of acetic anhydride to cause reaction with the swollen glucomannan. The reaction was conducted at 50° C. for 5 days. The reaction mixture was then poured into 7 λ of water with agitation. The precipitate formed was separated by filtration and was washed with water. The precipitate was then dried in air and then under vacuum. 3 g of this dried product were dissolved in 300 mλ of chloroform containing 10.5 mλ of decahydronaphthalene. This solution was then dropped into 3 λ of 2% aqueous solution of a by 90% saponified polyvinylalcohol with agitation and, by continuing an adequate agitation, liquid droplets of the chloroform solution having an average particle size of 44–105 μm were formed. By cooling this suspension gradually over 24 hours, solidified particles were obtained, which were separated by filtration and washed with water. This particulate product was then introduced into a solution composed of 270 mλ of methanol and 30 mλ of 10N NaOH and saponification was effected by maintaining the mixture for 24 hours with agitation. The so saponified beads were then separated by filtration and were introduced into a cross linking bath prepared by dissolving 35 g of epichlorohydrin in 300 mλ of a 1:1 mixture of acetone and dimethyl sulfoxide and the cross linking reaction was conducted at 60° C. for 24 hours.

(2) Introduction of Ion Exchangeable Group into the Beads

In a 300 mλ three-necked flask immersed in an ice bath, there were charged 5 g (dry weight) of cross-linked glucomannan beads and thereto were added 40 mλ of 4N aqueous solution of sodium hydroxide to soak the beads under agitation for 1 hour. Thereto were then added 10 mλ of aqueous solution of 2-chloro-triethylamine hydrochloride whose concentration had been adjusted to 3 g/mλ. The resulting mixture was heated to 80°-83° C. and the reaction was conducted for 1 hour. After 1 hour, the three-necked flask was immersed again in the ice bath to cool the reaction mixture, whereupon the beads were filtered on a filter cloth with aspiration. The beads were washed with about 5,000 mλ of deionized water. There was obtained an ion exchanger of cross-linked glucomannan beads into which bonded radicals of diethylaminoethyl had been introduced. The total ion-exchange capacity was determined by sampling a portion of the so obtained beads and subjecting it to a neutralization titration and was found to be 0.95 meq. per g of dry beads.

The cross-linked glucomannan beads having therein bonded radicals of DEAE-group obtained as above and stored under soaking in water were packed in a stainless steel column having a length of 300 mm and an inner diameter of 5 mm. Using this packed column, experiments were carried out as to the relationship between the flow rate of liquid passing through the column and the resulting pressure loss ($\Delta p$) by observing the flow rate and the liquid inlet pressure by flowing the liquid using a high pressure feed pump. The observed values are plotted on a graph as shown in FIG. 1.

As comparison examples, similar experiments were carried out using two commercial products, namely DEAE-Sephadex A-50 (trademark) and DEAE-Sepharose CL-6B (trademark) of the firm Pharmacia Fine Chemicals. The results are also plotted in the graph of FIG. 1 for the sake of comparison with those of the beads according to the present invention.

From the graph of FIG. 1, it is seen that the compressive strength of the DEAE-glucomannan ion exchanger of the present invention is considerably higher than that of the beads of DEAE-Sephadex A-50 and of DEAE-Sepharose CL-6B, since there holds a linear relationship between the flow rate and the pressure loss $\Delta p$ even at higher flow rates without causing any steep rise of pressure.

EXAMPLE 2

In a 50 mλ three-necked flask, 2 g (dry weight) of the cross-linked glucomannan beads obtained in the above (1) of Example 1 were soaked in 20 mλ of 10N aqueous solution of sodium hydroxide. While cooling the flask by immersing it in a constant temperature bath filled with ice water, the reaction mixture in the flask was kept agitated mildly for 1 hour using a stirrer. Thereto was added subsequently an aqueous solution of monochloroacetic acid (8 g of monochloroacetic acid + 16 mλ of ultra-high purity water) and the temperature of the contents of the flask was elevated up to 70° C. After 1 hour from the arrival at 70° C., the reaction mixture was filtered by a glass filter and the beads thus separated were washed with ultra-high purity water sufficiently. The ion exchange capacity of the so washed beads was determined after they had been subjected to a conditioning in a usual way. The capacity was found to be 2.3 meq. per g of dry beads.

EXAMPLE 3

Using a glass column having an inner diameter of 5 mm and a length of 100 mm packed with a DEAE-glucomannan ion exchanger having introduced therein bonded radicals of ion-exchangeable group prepared so as to have a total ion-exchange capacity of 0.15 meq. per mλ of gel, an adsorption-elution experiment was carried out for human albumin and for haemoglobin.

The concentration of these substances in the liquid to be passed through the column was settled each at 4 mg/mλ and the amount of charge thereof was adjusted at 5 μλ. For ion adsorption, a buffer solution of 0.02M tris(hydroxymethyl)-aminomethane (pH=8.02) was passed through the column at a flow rate of 0.5 mλ/min. For elution, a buffer solution of 0.5M NaCl/0.02M tris(hydroxymethyl)-aminomethane (pH=8.02) was passed through the column at a flow rate of 0.5 m λ/min. The elution time for each substance was found to be:

10.4 min. for human albumin
10.2 min. for haemoglobin

The flow rate of the solution was varied both for human albumin and for haemoglobin in the range from 0.5 m λ/min. to 5 mλ/min. and the column was re-used in the subsequent experiment after regeneration of the beads and water wash thereof. In the experiment using the conventional commercial product (DEAE-Sepharose), it was practically impossible to flow the solution at flow rates above 2 mλ/min.

We claim:

1. An ion exchanger based on cross-linked konjakmannan, comprising beads of cross-linked konjakmannan having radicals of one or more ion-exchangeable groups introduced therein by a chemical treatment thereof.

2. An ion exchanger according to claim 1, wherein the ion exchanger has an ion-exchange capacity of 0.1-5 meq. per g of dry beads.

3. An ion exchanger according to claim 1, wherein the starting beads of cross-linked konjakmannan have a degree of swelling in the range from 1.5 to 15, an exclusion limit molecular weight in the range from 200 to 100,000,000 and an average bead diameter in the range from 5 to 500 μm.

4. An ion exchanger according to claim 1, wherein the ion-exchangeable group to be introduced in the cross-linked konjakmannan is at least one selected from the group consisting of carboxymethyl, sulfomethyl, primary through quaternary aminoethyl, sulfopropyl and phosphato groups.

5. An ion exchanger according to claim 1, wherein said cross-linked konjakmannan is prepared from an esterified konjakmannan.

6. An ion exchanger according to claim 1, wherein said beads of cross-linked konjakmannan have a degree of swelling in the range of from 2 to 8.

7. An ion exchanger according to claim 5, wherein more than 85% of the hydroxyl groups in the konjakmannan have been esterified.

8. An ion exchanger according to claim 1, wherein said beads of cross-linked konjakmannan have an exclusion limit molecular weight in the range from 100,000 to 100,000,000.

9. An ion exchanger based on cross-linked konjakmannan, comprising beads of cross-linked konjakmannan having radicals of one or more ion-exchangeable groups introduced therein by a chemical treatment thereof; said ion-exchangeable groups being one or more members selected from the group consisting of carboxymethyl, sulfomethyl, primary through quaternary aminoethyl, sulfopropyl and phosphato groups; and said beads of cross-linked konjakmannan having a degree of swelling in the range of from 2 to 8, an exclusion limit molecular weight in the range from 100,000 to 100,000,000 and being prepared from an esterified konjakmannan having an esterification degree of more than 85%.

* * * * *

UNITED STATES PATENT AND TRADEMARK OFFICE
CERTIFICATE OF CORRECTION

PATENT NO. : 4 948 814
DATED : August 14, 1990
INVENTOR(S) : Yoshiaki MOTOZATO et al It is certified that error appears in the above-identified patent and that said Letters Patent is hereby corrected as shown below:

On the title page, item [73], change the assignees to read as follows:

---Kurita Water Industries, Ltd., Tokyo, and Yoshiaki Motozato, Kumamoto, Japan.---.

Signed and Sealed this

Twenty-sixth Day of April, 1994

Attest:

BRUCE LEHMAN

*Attesting Officer*   *Commissioner of Patents and Trademarks*